United States Patent [19]

Kusano et al.

[11] Patent Number: 5,616,652

[45] Date of Patent: Apr. 1, 1997

[54] MICROPOROUS CRUMBS OF HYDROGENATED BLOCK COPOLYMERS AND PROCESS FOR PRODUCING THE SAME

[75] Inventors: Manabu Kusano, Ibaraki-ken; Masao Ishii, Kashima; Nobuo Sukenobe, Ibaraki-ken, all of Japan

[73] Assignee: Kuraray Co., Ltd., Kurashiki, Japan

[21] Appl. No.: 611,820

[22] Filed: Mar. 6, 1996

[30] Foreign Application Priority Data

Mar. 6, 1995 [JP] Japan .................. 7-072414

[51] Int. Cl.$^6$ .................. C08F 6/10; C08F 6/12
[52] U.S. Cl. .................. 525/315; 525/316; 528/500
[58] Field of Search .................. 525/315, 316; 528/500

[56] References Cited

U.S. PATENT DOCUMENTS

| | | | |
|---|---|---|---|
| 4,347,098 | 8/1982 | Hubby | 159/16 S |
| 4,408,039 | 10/1983 | Irvin | 528/500 |
| 4,423,207 | 12/1983 | Flock et al. | 528/499 |
| 5,407,974 | 4/1995 | Dallmeyer | 523/328 |

FOREIGN PATENT DOCUMENTS

| | | |
|---|---|---|
| 2187403 | 7/1990 | Japan . |
| 2185503 | 7/1990 | Japan . |
| 2182703 | 7/1990 | Japan . |
| 0726105 | 4/1980 | U.S.S.R. . |
| 1049585 | 3/1964 | United Kingdom . |

*Primary Examiner*—Irina S. Zemel
*Attorney, Agent, or Firm*—Oblon, Spivak, McClelland, Maier & Neustadt, P.C.

[57] ABSTRACT

Microporous crumbs of a hydrogenated block copolymer, produced by the process comprising feeding a solution of a hydrogenated block copolymer in a hydrocarbon solvent at a concentration of said hydrogenated block copolymer within a range from 5% to 60% by weight into hot water while maintaining the temperature of said solution at 40° C.–150° C., and then steam stripping at a temperature higher than the boiling point of the hydrocarbon solvent or higher than the azeotropic point of the hydrocarbon solvent and water when they form an azeotropic mixture and lower than 150° C., wherein said hydrogenated block copolymer is obtained by hydrogenating more than 50% of unsaturated bonds derived from conjugated diene of a block copolymer having at least one polymer block consisting essentially of a vinyl aromatic compound and at least one polymer block consisting essentially of a conjugated diene in which the weight ratio of the vinyl aromatic compound to the conjugated diene is within a range from 5/95 to 95/5, and wherein said crumbs have (1) a bulk density of more than 0.18 g/cc, (2) a total volume of micropores of is more than 0.4 cc/g and (3) a ratio of the sum of the volume of micropores having a pore diameter within a range from 0.14 to 3.9 μm based on the total volume of the micropores of more than 8% are provided. The microporous crumbs can absorb a softening agent, a plasticizer and the like uniformly and rapidly, have an excellent handling property and provide molding compounds free of non-melted matters.

6 Claims, No Drawings

MICROPOROUS CRUMBS OF HYDROGENATED BLOCK COPOLYMERS AND PROCESS FOR PRODUCING THE SAME

BACKGROUND OF THE INVENTION

1. Field of the Invention

The present invention relates to microporous crumbs of a hydrogenated block copolymer comprising at least one polymer block of a vinyl aromatic compound and at least one polymer block of a conjugated diene, and the process for producing the same. The crumbs of the present invention absorb a softening agent, a plasticizer and the like uniformly and rapidly, have an excellent handling property, even after absorption, and provide molding compounds free of non-melted residuals, i.e., residual solids remaining as not melted (hereinafter simply referred to as "non-melted matters").

2. Related Art of the Invention

The hydrogenated block copolymer comprising at least one polymer block of a vinyl aromatic compound and at least one polymer block of a conjugated diene (hereinafter simply referred to as "hydrogenated block copolymer") is not only excellent in weather proofness, heat resistance, impact resistance and flexibility but also shows, without vulcanization, good strength and elastic property comparable to that of conventional vulcanized rubber, so that it has been utilized widely in the fields of daily necessities, automobile parts, light electrical appliance parts, parts of various industrial products and the like.

As prior art references which disclose the process for production of hydrogenated block copolymers, the following documents are exemplified: Canadian Patent No. 815,575, British Patent No. 1,043,023 and U.S. Pat. Nos. 3,333,024, 3,644,588, 3,686,366 and 3,700,748.

The hydrogenated block copolymer is usually produced by polymerizing a vinyl aromatic compound and a conjugated diene in a hydrocarbon solvent to give a block copolymer and hydrogenating said block copolymer. This process requires a step of isolating the hydrogenated block copolymer from the hydrocarbon solvent, because the hydrogenated block copolymer is obtained dissolved or suspended in the solvent. Various methods have been utilized to isolate the hydrogenated block copolymer from the hydrocarbon solvent. Among them, a steam stripping method has been known as described, for example, in Japanese Patent Publication Nos. Sho 57-47684 and Sho 57-53363, wherein a solution of a hydrogenated block copolymer in the hydrocarbon solvent is introduced into hot water in order to remove the solvent by distillation together with water and to make crumbs of the hydrogenated block copolymer.

However, crumbs of the hydrogenated block copolymer obtained by the steam stripping method suffer from the following disadvantages: (a) The crumbs cannot absorb a softening agent, a plasticizer and the like uniformly and rapidly, since the total volume of the micropores of the crumbs is too small or the ratio of the sum of the volume of micropores having a pore diameter within a specific range relative to the total volume of the micropores of the crumbs is too small although the crumbs have micropores with a moderate pore diameter on average. (b) The crumbs have a poor handling property after the absorption of the softening agent, plasticizer and the like, and provide a molding compound with considerable non-melted matters when kneaded with a resin such as polypropylene or polyethylene, since the pore diameter of the crumbs is too large or the bulk density of the crumbs is too low.

SUMMARY OF THE INVENTION

It is an object of the present invention to provide microporous crumbs of a hydrogenated block copolymer which absorb a softening agent, a plasticizer and the like uniformly and rapidly, have an excellent handling property and provide kneaded molding compounds free of non-melted matters upon kneading.

Further, it is another object of the present invention to provide a process for the production of the above-described microporous crumbs.

These objects of the present invention can be achieved by the invention described below.

The present invention provides microporous crumbs of a hydrogenated block copolymer, wherein said hydrogenated block copolymer is obtained by hydrogenating more than 50% of unsaturated bonds derived from conjugated diene of a block copolymer comprising at least one polymer block consisting essentially of a vinyl aromatic compound and at least one polymer block consisting essentially of a conjugated diene in which the weight ratio of the vinyl aromatic compound to the conjugated diene is within a range from 5/95 to 95/5, and wherein said crumbs have (1) a bulk density of more than 0.18 g/cc, (2) a total volume of micropores of more than 0.4 cc/g and (3) a ratio of the sum of the volume of micropores having a pore diameter within a range from 0.14 to 3.9 µm based on the total volume of the micropores of more than 8%.

Further, the present invention also provides a process for producing the microporous crumbs, which comprises feeding a solution of the hydrogenated block copolymer obtained by hydrogenating more than 50% of unsaturated bonds derived from conjugated diene of a block copolymer comprising at least one polymer block consisting essentially of a vinyl aromatic compound and at least one polymer block consisting essentially of a conjugated diene in which the weight ratio of the vinyl aromatic compound to the conjugated diene is within a range from 5/95 to 95/5 in a hydrocarbon solvent at a concentration of said hydrogenated block copolymer within a range from 5% to 60% by weight, into hot water while maintaining the temperature of said solution at 40° C. –150° C., and then steam stripping at a temperature higher than the boiling point of the hydrocarbon solvent or higher than the azeotropic point of the hydrocarbon solvent and water when they form an azeotropic mixture and lower than 150° C.

DETAILED DESCRIPTION OF THE INVENTION

The present invention is now described in detail.

The crumbs of a hydrogenated block copolymer provided by the present invention comprise the hydrogenated block copolymer obtained by hydrogenating more than 50% of unsaturated bonds derived from conjugated diene of a block copolymer comprising at least one polymer block consisting essentially of a vinyl aromatic compound and at least polymer block consisting essentially of a conjugated diene in which the weight ratio of the vinyl aromatic compound to the conjugated diene is within a range from 5/95 to 95/5, preferably, from 10/90 to 90/10.

If the weight ratio of the vinyl aromatic compound to the conjugated diene in the block copolymer is outside the range of 5/95 to 95/5, crumbs tend to cause blocking with each other in the production process thereof. On the other hand, if the hydrogenation ratio is outside the above-mentioned range, the heat resistance of the hydrogenated block copolymer is poor, resulting in thermal decomposition of the hydrogenated block copolymer in the production of the crumbs, coloration of the crumbs or deposition of crumbs on the production apparatus.

The structure of the hydrogenated block copolymer is represented, for example, by the following general formula:

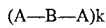

wherein A represent a polymer block consisting essentially of a vinyl aromatic compound, B represents a polymer block consisting essentially of a conjugated diene such as isoprene or butadiene and k is an integer of 1 to 5, or

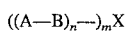

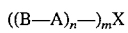

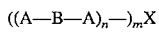

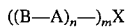

wherein A and B have the same meanings as defined above, X represents a residue of a coupling agent, for example, silicon tetrachloride, tin (IV) chloride, polyhalogenated hydrocarbon, a carboxylic acid ester such as phenyl benzoate or a vinyl compound such as divinyl benzene, or a residue of an initiator, for example, an organolithium compound, and m and n each represents an integer of 1 or more.

The vinyl aromatic compound, includes, for example, styrene, o- or p-methyl styrene, p-tert-butyl styrene, 1,3-dimethyl styrene, α-methyl styrene, vinyl naphthalene and vinyl anthrathene. Among them, styrene is preferably used. The vinyl aromatic compound can be used alone or in combination.

The conjugated diene includes, for example, 1,3-butadiene, isoprene, 2,3-dimethyl-1,3-butadiene, 1,3-pentadiene and 1,3-hexadiene. Of these, 1,3-butadiene or isoprene is preferably used. The conjugated diene can be used alone or in combination.

The hydrogenated block copolymer can be substituted with a functional group on at least one terminal atom of the molecular chain. The functional group contains at least one atom such as nitrogen, oxygen, silicon, phosphorus, sulfur and tin. The functional group includes, for example, carboxyl group, carbonyl group, thiocarbonyl group, acid anhydride group, thiocarboxy group, aldehyde group, thioaldehyde group, carboxylic ester group, amide group, sulfonic group, sulfonyl ester group, phosphoric group, phosphonyl ester group, amino group, imino group, nitrile group, epoxy group, epithio group, sulfide group, isocyanate group, halogenated silicon group and hydroxy group.

The hydrogenated block copolymer can be produced by any known method such as an anionic polymerization process or a cationic polymerization process. As an example of a specific method for the production of the hydrogenated block copolymer, a method which comprises polymerizing a vinyl aromatic compound and a conjugated diene successively in a hydrocarbon solvent using an organolithium compound as a polymerization initiator to form a block copolymer and hydrogenating the formed block copolymer is illustrated.

The hydrocarbon solvent used in this process includes, for example, aliphatic hydrocarbons such as butane, pentane, hexane, isopentane, heptane, octane and isooctane; cycloaliphatic hydrocarbons such as cyclopentane, methylcyclopentane, cyclohexane, methylcyclohexane and ethylcyclohexane; and aromatic hydrocarbons such as benzene, toluene, ethylbenzene and xylene. The hydrocarbon solvent can be used alone or in combination.

Further, as the organolithium compound for the polymerization initiator, a lithium compound having one or more lithium atoms can be used. The organolithium compound includes, for example, ethyl lithium, n-propyl lithium, isopropyl lithium, n-butyl lithium, sec-butyl lithium, tert-butyl lithium, hexamethylene dilithium, butadienyl dilithium and isoprenyl dilithium. The organolithium compound can be used alone or in combination.

Upon polymerization, a randomizing agent can be used in order to control the polymerization rate, the microstructure of the polymer block of conjugated diene (cis-, trans-structure or degree of vinyl bond content), and the ratio of reactivity of the vinyl aromatic compound to the conjugated diene. The randomizing agent includes, for example, ethers such as dimethyl ether, diphenyl ether, tetrahydrofuran, diethylene glycol dimethyl ether and diethylene glycol dibutyl ether; amines such as trimethylamine, triethylamine, tetramethylethylene diamine and cyclic tertiary amine; and phosphorus compounds such as triphenyl phosphine and hexamethyl phosphoroamide.

For the formation of the block copolymer, the time for polymerization can be determined as required for the polymerization of the vinyl aromatic compound and the conjugated diene, and the temperature for polymerization is generally within a range from −10° C. to 150° C., preferably, from 40° C. to 120° C.

The number average molecular weight of the thus formed block copolymer for hydrogenation is generally within a range from 5,000 to 1,500,000, preferably, from 10,000 to 500,000.

The block copolymer is hydrogenated in accordance with any known method as disclosed, for example, in Canadian Patent No. 815,575, British Patent No. 1,043.023 and U.S. Pat. No. 3,333,024, such that more than 50%, preferably, more than 80% of the unsaturated bonds derived from conjugated diene of the block copolymer should be saturated. For the hydrogenation of the block copolymer, it is preferred to use the same hydrocarbon solvent as that used for the formation of the block copolymer. Further, as the hydrogenating catalyst, a carrier type heterogeneous catalyst that carries metal such as Ni, Pt, Pd or Ru on a support such as carbon, silica, alumina or diatomaceous earth, or a Ziegler type homogeneous catalyst comprising an organic acid salt of Ni, Co, Fe or Cr in combination with a reducing agent such as an organoaluminum compound can be used.

As a result of the hydrogenation, the hydrogenated block copolymer can be obtained in the form of a solution in a hydrocarbon solvent.

The microporous crumbs of the present invention have a bulk density of more than 0.18 g/cc, preferably, more than 0.20 g/cc, a total volume of micropores of more than 0.4 cc/g and a ratio of the sum of the volume of micropores having a pore diameter within a range from 0.14 to 3.9 μm of more than 8% based on the total volume of the micropores. If the bulk density of the crumbs is less than 0.18 g/cc, the handling property of the crumbs after the absorption of a softening agent, a plasticizer or the like is poor. Where the total volume of the micropores of the crumbs is less than 0.4 cc/g, the crumbs cannot absorb a sufficient amount of a softening agent, a plasticizer and the like. Also with regard to the distribution of the pore diameter, if the ratio of the sum of the volume of micropores having a pore diameter within a range of 0.14 to 3.9 µm based on the total volume of micropores of the crumbs is outside the above-mentioned range, the crumbs cannot absorb a softening agent, a plasticizer and the like uniformly and rapidly.

Further, it is preferred that the microporous crumbs of the present invention contain crumbs within a range of particle size from 0.2 to 5 mm at a ratio of more than 90% by weight based on the total weight of the crumbs. If the ratio of the crumbs having a particle size smaller than 0.2 mm is too high, the crumbs lose the excellent handling property and also tend to cause a problem of dust generation in use, making the working environment worse. On the other hand, if the ratio of crumbs having a particle size greater than 5 mm is too high, the processability of the crumbs is sometimes worsened.

The above-mentioned microporous crumbs can be obtained by subjecting a solution of the hydrogenated block copolymer in a hydrocarbon solvent, prepared by aforementioned method, etc., to a steam stripping process under predetermined conditions.

It is important for the steam stripping process to control the concentration of the hydrogenated block copolymer in the hydrocarbon solvent within a range from 5% to 60% by weight, preferably, from 10% to 50% by weight. Further, it is important for the steam stripping process to feed the solution of the hydrogenated block copolymer in the hydrocarbon solvent which is maintained at a temperature from 40° C. to 150° C. into hot water and to conduct steam stripping at a temperature higher than the boiling point of the hydrocarbon solvent or the azeotropic point of the hydrocarbon solvent and water when they form an azeotropic mixture and lower than 150° C.

If the concentration of the hydrogenated block copolymer in the hydrocarbon solvent is lower than 5% by weight, the efficiency of removal of the solvent is poor, since the amount of the solvent relative to the hydrogenated block copolymer is large, which is disadvantageous in view of the cost of production of the crumbs. On the other hand, if the concentration of the hydrogenated block copolymer in the hydrocarbon solvent exceeds 60% by weight, the high viscosity of the solution causes problems such as clogging during the feeding step. When the concentration of the hydrogenated block copolymer in the hydrocarbon solvent is lower than 5% by weight, the concentration can be controlled by using a concentrator selected from one- or multi-stage flushing vessels, stirring vessels, thin layer evaporators and the like. On the other hand, if the concentration of the hydrogenated block copolymer in the hydrocarbon solvent exceeds 60% by weight, the concentration can be controlled by dilution with a hydrocarbon solvent.

If the temperature of the solution of the hydrogenated block copolymer in the hydrocarbon solvent subjected to the steam stripping is lower than 40° C., microporous crumbs can be obtained, but the low bulk density of the crumbs leads to a poor handling property of the crumbs after the absorption of a softening agent, a plasticizer and the like. On the other hand, if the temperature of the solution of the hydrogenated block copolymer subjected to the steam stripping is higher than 150° C., the total volume of the micropores of the crumbs is reduced to decrease the amount of the softening agent, the plasticizer and the like that can be absorbed by the crumbs. The temperature of hot water employed in the present invention is within a range from about 80° C. to 130° C., preferably from 100° C. to 120° C.

If the temperature upon conducting the steam stripping is lower than the boiling point of the hydrocarbon solvent or lower than the azeotropic point of the hydrocarbon solvent and water, the efficiency of removal of the solvent is poor, which is disadvantageous in view of the cost of production of the crumbs. On the other hand, if the temperature upon conducting the steam stripping is higher than 150° C., problems such as coloration of the crumbs or decomposition of the hydrogenated block copolymer result.

The temperature upon conducting the steam stripping is within a range usually from 90° to 140° C., preferably, from 95° C. to 120° C.

In the above stream stripping process, a surfactant can be added to the hot water in a steam stripping vessel in order to prevent coagulation of crumbs. The surfactant includes, for example, anionic surfactants such as various kinds of carboxylic acid salt type surfactants, e.g., soap, N-acylamino acid salt, alkylether carboxylic acid salt and acylated peptide; various kinds of sulfonic acid salt type surfactants, e.g., alkylsulfonate, alkylbenzene or alkylnaphthalene sulfonate, sulfonylsuccinate, α-olefin sulfonate, and N-acylsulfonate; various kinds of sulfate ester type surfactants, e.g., sulfated oil, alkyl sulfate, alkylether sulfate, alkylallyl ether sulfate and alkylamide sulfate; various kinds of phosphate ester type surfactants, e.g., alkylphosphate, alkylether phosphate and alkylallyl phosphate; cationic surfactants such as aliphatic amine salt, aliphatic quaternary ammonium salt, pyridinium salt and imidazolinium salt; amphoteric surfactants such as carboxybetain type surfactant, sulfobetain type surfactant, aminocarboxylate salt and imidazoline derivatives; or nonionic surfactants such as ether type surfactants, e.g., alkyl and alkylallyl polyoxyethylene ether, alkylallyl formaldehyde condensated polyoxyethylene ether, polyoxypropylene type block copolymer and polyoxyethylene polyoxypropylene alkyl ether; ether ester type surfactants, e.g., glycerine ester polyoxyethylene ether, sorbitan ester polyoxyethylene ether and sorbitol ester polyoxyethylene ether; ester type surfactants, e.g., polyethylene glycol fatty acid ester, glycerine ester, polyglycerine ester, sorbitan ester, propylene glycol ester and sucrose ester; or various kinds of nitrogen-containing type compounds.

The surfactants can be properly selected in accordance with the conditions such as the structure of the hydrogenated block copolymer, and the solvent used in the formation of the block copolymer and hydrogenation thereof.

In addition, the optional injection of an inert gas such as nitrogen or argon into a storage vessel for the solution of the hydrogenated block copolymer in the hydrocarbon solvent in order to load a pressure of from 0.1 kg/cm$^2$ to 0.3 kg/cm$^2$, gets the solution easily fed to the steam stripping step.

A slurry of the microporous crumbs of the hydrogenated block copolymer dispersed in water is obtained by the steam stripping process described above. The microporous crumbs can be isolated by subjecting the obtained slurry to a conventional drying process. In this drying process, it is important to set drying conditions harmless to the micropores of the hydrous crumbs obtained in the steam stripping process. For this purpose, it is preferred to use, for example, a two stage process, wherein the obtained slurry is dehydrated by mechanical squeezing to produce wet crumbs of water content of 1% to 60% by weight in the first stage and then the water content of the crumbs is reduced to less than 1% by weight under heating in the second stage.

Specifically, in the dehydrating step of the first stage, the hydrous crumbs are separated from water with a centrifuge or a compressing dehydrator such as a roll, a Banbury dehydrator or a screw extrusion type squeezing dehydrator. It is desirable, in this stage, to reduce the water content of the crumbs to 1% to 60% by weight, preferably, 3% to 30% by weight. If the water content of the crumbs, in this stage, is higher than 60% by weight, the amount of water to be removed in the second stage is extremely large that is not desired in view of the cost of production of the crumbs. On the other hand, reduction of water content of the crumbs to less than 1% by weight in the first stage takes a long time for dehydration or causes deterioration to the crumbs by the shearing stress produced by the water removing machine.

In the second stage, the wet crumbs obtained in the first stage are dried until the water content of the crumbs is reduced to lower than 1% by weight. The water content of more than 1% by weight causes a problem such as foaming or the like upon molding the obtained crumbs alone or together with another resin. The apparatus used for drying include, for example, a screw extrusion type drier, kneader type drier, expander type drier, hot blow type drier or plate type drier.

To the microporous crumbs of the present invention, various kinds of additives can be added depending on the purpose of use. The additives include, for example, a softening agent such as oil, a plasticizer, an antistatic agent, a lubricant, a UV-ray absorber, a flame retardant, a pigment, a dye, an inorganic filler, an organic fiber, an inorganic fiber and carbon black. Various kinds of thermoplastic resins can be blended with the crumbs of the present invention. Examples of such thermoplastic resins are olefinic resins such as polypropylene, polyethylene, ethylene-vinyl acetate copolymer (EVAc), ethylene-vinyl alcohol copolymer (EVOH); polyesters such as polyethylene terephthalate (PET), polybutylene terephthalate (PBT) and polyethylene naphthalate (PEN); aliphatic polyamides such as nylon 6, nylon 66 and nylon 12; semiaromatic polyamide comprising terephthalic acid and various kinds of aliphatic diamine; ABS resin; AES resin; polypropylene oxide (PPO) and styrenic resin.

The additives or thermoplastic resins described above and the microporous crumbs of the present invention can be kneaded generally by a method of mechanically kneading under melting with a kneader employed conventionally for kneading of thermoplastic resins. Examples of the kneader are a single-screw extruder, twin-screw extruder, Banbury mixer, twin roll and the like.

Since the microporous crumbs of the present invention have a bulk density of more than 0.18 g/cc, a total volume of micropores of more than 0.4 cc/g and a ratio of the sum of the volume of micropores having a pore diameter within a range from 0.14 to 3.9 μm of more than 8% based on the total volume of the micropores of the crumbs, they can absorb a softening agent, a plasticizer or the like uniformly and rapidly, have an excellent handling property, even after absorption, and provide molding compounds free of non-melted matters. The crumbs of the present invention can be molded into various kinds of products such as sheet, film, injection molding product, blow molding product, pressure forming product, vacuum forming product and extrusion molding product, or prepared into non-woven fabrics or fibrous products by means of melt-blowing method or spun bonding method. They can also be used as modifiers for various kinds of thermoplastic resins. As specific application uses, they can be used as materials for foot wares such as sport shoes, leisure shoes, fashion sandals and leather shoes; adhesives used for book binding and paper diapers; asphalt modifiers used for road pavement, water proof sheets and pipeline coating; materials for electric wire cables; home electronics products such as television receivers, stereo sets and vacuum cleaners; interior and exterior parts of automobiles such as dampers, body panels and side seals; industrial products; home goods; toys; food packaging materials or food containers such as trays for meat and fish, vegetable and fruits packages and chilled food containers; packaging materials for daily necessities and industrial materials; laminating agents for fabric or leather products; stretchable materials for paper diapers; various kinds of rubber products such as hoses, tubes and belts, as well as medical products.

Other features of the present invention will become apparent in the course of the following descriptions of exemplary embodiments which are given for illustration of the present invention and are not intended to be limiting thereof.

EXAMPLES

In the following examples, "parts" and "%" are on the basis of weight unless otherwise specified. Further, the physical properties of the polymer were measured by the following methods. (Molecular Weight)

A solution of a polymer in tetrahydrofuran was prepared and measured by gel permeation chromatography (GPC) at 25° C. to determine a number average molecular weight (Mn) calculated as polystyrene. (Styrene Content)

IR absorption spectra of the polymer were measured by an IR spectrometer to determine the styrene content in the polymer with reference to a calibration line prepared based on IR absorption spectra of a sample for which the styrene content was previously known. (Hydrogenation Ratio)

After dissolving the polymer in chloroform, iodine value was measured by titration with potassium iodide to calculate the hydrogenation ratio. (Bulk Density of Crumbs)

20 g of dried crumbs of water content of less than 1% were packed in a 200 ml measuring cylinder, and the measuring cylinder was spontaneously dropped from a vertical height of 3 cm. After that, the volume of the crumbs was measured to calculate the bulk density. For instance, the bulk density is 0.20 g/cc when the measured volume of the crumbs is 100 ml, while the bulk density is 0.25 g/cc when the measured volume of the crumbs is 80 ml. (Total Volume of Micropore of Crumbs and Micropore Distribution of Crumbs)

Measured by mercury porosimetry with a mercury porosimeter (micromeritics type AUTOPORE, manufactured by Shimazu Seisakusho Co., Ltd.). (Rate and Amount of Oil Absorption of Crumbs)

20 g of dried crumbs were charged in a bag of 10 cm×10 cm in size made of 200 mesh filter cloth of nylon filaments and immersed for 3 minutes and 30 minutes in an excessive amount of paraffinic process oil (Diana Process Oil PW-90, manufactured by Idemitsu Petrochemical Co., Ltd.). In each case they were pulled up together with the bag and after the drainage of excess oils for 10 minutes, weight of the crumbs was measured to calculate how much oil was absorbed for the weight of the crumbs. Hereinafter, the calculated data was referred simply to as "oil absorption factor."

The rate of oil absorption of the crumbs was judged from the oil absorption factor for 3 minutes, while the amount of oil absorption of the crumbs was judged from the oil absorption factor for 30 minutes. (Handling Property of Crumbs After the Absorption of Oils)

In the above-mentioned evaluation for the rate and amount of oil absorption, crumbs after the absorption of oils evaluated for the oil absorption factor for 30 minutes were placed on a plate made of stainless steel inclined by 60° from a horizontal surface, and sagging of the crumbs was confirmed visually. The extent of the sagging of the crumbs was defined as a judging criteria as to whether the crumbs are easily fed to an extruder or not in order to make evaluation of the handling property of the crumbs after the absorption of oils. The crumbs showing a greater extent of sagging have a better handling property.

Indication for the result of evaluation of the handling property (♦: excellent, ◊: good, x: poor)

(Properties of Molded Product)

After preliminarily mixing 100 parts by weight of dried crumb, 40 parts by weight of commercially available polypropylene (MA-3 manufactured by Mitsubishi Petrochemical Co., Ltd.) and 100 parts by weight of the above-described paraffinic process oil in a tumbler, the obtained mixture was kneaded under melting at 210° C. by a twin-screw extruder to obtain pellets. The thus obtained pellets were molded into a flat plate of 10 cm×10 cm×3 mm (thickness) in size with an injection molding machine. The oil bleed on the surface of the plate, the presence or absence of non-melted matters in the plate and the state of foaming in the plate were observed visually.

Indication for the result of evaluation of the appearance of the molded product (1) Oil bleed
 ♦: excellent (not observed), ◊: good (slightly observed),
 x: poor (moderately or largely observed)
(2) Non-melted matter in the molded product
 ◊: not observed, x: observed
(3) State of foaming in the molded product
 ♦: excellent (foaming is not observed), ◊: good (foaming is slightly observed), x: poor (foaming is moderately or largely observed)

Test pieces were punched out from the molded flat plate and measured for strength at break and elongation at break according to the method as described in JIS K6301. The test piece was of a No. 3 type dumbbell form defined in JIS K6301 having 5 mm of width thereof and 20 mm distance between bench markers thereon. The strength at break and the elongation at break were measured at a test speed of 500 mm/min.

Example 1

800 kg of anhydrous cyclohexane and a solution of 960 g of sec-butyl lithium in toluene at a concentration of 10 wt % (1.5 mol as sec-butyl lithium) were fed to a polymerizing reaction vessel and stirred at 50° C. 30 kg of anhydrous styrene was fed to the mixture at a rate of 0.5 kg/min, and the resulting mixture was reacted further for one hour while stirring. Then, 140 kg of anhydrous isoprene was fed to the mixture at a rate of 1.0 kg/min, and the resulting mixture was further reacted for one hour. Finally, 30 kg of anhydrous styrene was fed again to the mixture and the obtained mixture was reacted for one hour to give 1000 kg of a solution of styrene-isoprene-styrene tri-block copolymer (hereinafter styrene-isoprene styrene tri-block copolymer is simply referred to as "SIS") with an average number molecular weight of 200,000 and a styrene content of 30 wt % in cyclohexane. The concentration of SIS of the solution was 20% by weight.

Raney nickel was added to the obtained solution of SIS in cyclohexane in an amount of 0.2% based on SIS and hydrogenation of SIS was conducted under a hydrogen pressure of 50 kg/cm² to give 1008 kg of a solution of hydrogenated SIS (hereinafter, hydrogenated SIS is simply referred to as "SEPS") with an average number molecular weight of 200,000, a styrene content of 29.8 wt % and a hydrogenation ratio of 98 mole % in cyclohexane. The concentration of SEPS of the solution was 20.6% by weight.

The obtained solution of SEPS in cyclohexane was warmed to 50° C. and subjected to steam stripping at 110° C. by feeding the solution at a rate of 100 kg/hr to hot water (110° C.) containing sodium dodecylbenzene sulfonate (hereinafter simply referred to as "DBS") in an amount of 0.15 g per 100 g of the solution of SEPS.

The obtained slurry of crumbs was dehydrated to give wet crumbs of water content of 45 wt % by twin rolls. In this stage, the temperature of the slurry was controlled by steam within a range of 110±2° C. (first stage of the drying process). Then, dried crumbs of water content of 0.1 wt % were obtained by drying the wet crumbs under heating with a plate drier at 120° C. (second stage in the drying process).

Table 1 shows the physical properties of the hydrogenated block copolymer and conditions employed in the steam stripping process.

The dried crumbs had a bulk density of 0.23 g/cc, a total volume of micropores of 0.80 cc/g and a ratio of the sum of the volume of micropores having a pore diameter within a range from 0.14 to 3.9 μm was 15% based on the total volume of the micropores of the crumbs. Table 2 shows the oil absorption factor after immersing the crumbs in oil for 3 minutes and 30 minutes.

Table 2 also shows the handling property of the crumbs after the absorption of oil and the result of evaluation of the appearance, the strength at break and the elongation at break of the molded products obtained from the molding compound prepared from the crumbs, polypropylene and paraffinic process oil (softening agent).

As shown in Table 2, the crumbs obtained in Example 1 show a satisfactory rate and amount of oil absorption, and have an excellent handling property after the absorption of oil. In addition, the molded product obtained from the molding compound prepared from the crumbs of Example 1 also show satisfactory appearance and physical properties.

Comparative Example 1

Polymerization reaction, hydrogenating reaction, steam stripping process and drying process were conducted in the same manner as Example 1 except for changing the warming temperature for the solution of SEPS in cyclohexane to 20° C., to give dried crumbs. Table 2 shows various kinds of properties of the dried crumbs and various kinds of properties of molded product obtained from the molding compound prepared from the crumbs.

The dried crumbs had a low bulk density and a small ratio of the sum of the volume of micropores having a pore diameter within a range from 0.14 to 3.9 μm based on the total volume of the micropores of the crumbs. The dried crumbs have an oil absorption factor comparable to that of the dried crumbs of Example 1, but have a poor handling property after absorption of oil. Further, the molded product shows oil bleeding and has a low strength at break. Example 2

1,002 kg of a solution of SEPS in cyclohexane (concentration of SEPS: 24 wt %) with a styrene content of 25 wt %, a number average molecular weight of 100,000 and a hydrogenation ratio of 98 mole % was obtained by the same procedures as those in Example 1. The solution of SEPS in cyclohexane was warmed to 80° C., and fed at a feed rate of 100 kg/hr to hot water (110° C.) containing no surfactant and stream stripping was conducted at 98° C. The obtained slurry was treated in the same manner as in Example 1 to give dried crumbs of water content of 0.1 wt %. The dried crumbs had a bulk density of 0.25 g/cc, a total volume of micropores of 0.70 cc/g and a ratio of the sum of the volume of micropores having a pore diameter within a range of 0.14 to 3.9 μm of 22% based on the total volume of the micropores of the crumbs. In the same manner as in Example 1, various kinds of properties of the crumbs and various kinds of properties of the molded product obtained from the molding compound prepared from the crumbs were measured. The results are shown in Table 2.

Comparative Example 2

Polymerization reaction, hydrogenating reaction, steam stripping process and drying process were conducted in the same manner as Example 2 except for changing the warming temperature for the solution of SEPS in cyclohexane to 160° C., to give dried crumbs. The dried crumbs had a high bulk density of 0.30 g/cc, but the total volume of the micropores of the crumbs was as small as 0.35 cc/g and the ratio of the sum of the volume of the micropores having a pore diameter within a range from 0.14 to 3.9 μm was 6% based on the total volume of micropores of the crumbs.

Table 2 shows the various kinds of properties of the crumbs and various kinds of properties of the molded product obtained from the molding compound prepared from the crumbs. The crumbs had a poor rate and amount of oil absorption. In addition, the molded product contained a considerable amount of non-melted matters, and looks coarse.

Example 3

966 kg of a solution of a hydrogenated styrene isoprene diblock copolymer (hereinafter referred to as "SEP") with a styrene content of 35 wt %, a number average molecular weight of 150,000 and a hydrogenation ratio of 97 mole % in cyclohexane (concentration of SEP: 22 wt %) was obtained according to a similar polymerization reaction and hydrogenation reaction as those in Example 1. The solution of SEP in cyclohexane was warmed to 45° C. and subjected to steam stripping at 98° C. by feeding the solution at a rate of 100 kg/hr to hot water (110° C.) containing DBS in an amount of 0.2 g per 100 g of the solution of SEP under a pressure of nitrogen at 3.0 kg/cm².

The obtained slurry was treated in the same manner as in Example 1 to give dried crumbs of water content of 0.08 wt %.

The dried crumbs had a bulk density of 0.23 g/cc, a total volume of micropores of 0.60 cc/g and a ratio of the sum of the volume of micropores having the pore diameter within a range from 0.14 to 3.9 μm was 21% based on the total volume of the micropores of the crumbs. In the same manner as in Example 1, various kinds of properties of the crumbs and the various kind of properties of the molded product obtained from the molding compound prepared from the crumbs were measured. The results are shown in Table 2.

Comparative Example 3

Polymerization reaction, hydrogenating reaction, steam stripping process and drying process were conducted in the same manner as Example 3 except for changing the warming temperature for the solution of SEP in cyclohexane to 35° C., to give dried crumbs. The dried crumbs had a low bulk density of 0.14 g/cc and a total volume of micropores of 0.78 cc/g, but the ratio of the sum of the volume of micropores having a pore diameter within range from 0.14 to 3.9 μm was 4% based on the total volume of the micropores of the crumbs.

Various kinds of properties of the crumbs and various kinds of properties of the molded product obtained from the molding compound prepared from the crumbs were measured. The results are shown in Table 2. The dried crumbs show an oil absorption factor comparable to that of the dried crumbs of Example 3, but have a poor handling property after absorption of oil. Further, the molded product shows oil bleeding and has a low strength at break.

TABLE 1

| | Spec of hydrogenated block copolymer | | | | Condition for steam stripping process | | | | |
|---|---|---|---|---|---|---|---|---|---|
| | | | | | Concentration of hydro- | Temperature of solution of | Injection | Condition in steam stripping vessel | |
| | Struc- ture (‡) | Molecular weight GPC (Mn × 10⁴) | Styrene content (wt %) | Hydrogenation rate (mole %) | genated block copolymer (wt %) | hydrogenated block copolymer to be fed (°C.) | of inert gas | Tem- perature | Sur- factant |
| Example 1 | A B A | 20 | 30 | 98 | 20.6 | 50 | Not carried out | 110 | Added |
| Comparative Example 1 | A B A | 20 | 30 | 98 | 20.6 | 20 | Not carried out | 110 | Added |
| Example 2 | A B A | 10 | 25 | 98 | 24.0 | 80 | Not carried out | 98 | Not added |
| Comparative Example 2 | A B A | 10 | 25 | 98 | 24.0 | 160 | Not carried out | 98 | Not added |
| Example 3 | A B | 15 | 35 | 97 | 22.0 | 45 | Carried out | 98 | Added |
| Comparative Example 3 | A B | 15 | 35 | 97 | 22.0 | 35 | Carried out | 98 | Added |

TABLE 1-continued

|  | Spec of hydrogenated block copolymer | | | Condition for steam stripping process | | | | |
|---|---|---|---|---|---|---|---|---|
|  | | | | Concentration of hydrogenated block copolymer (wt %) | Temperature of solution of hydrogenated block copolymer to be fed (°C.) | Injection of inert gas | Condition in steam stripping vessel | |
|  | Structure (‡) | Molecular weight GPC (Mn × 10⁴) | Styrene content (wt %) | Hydrogenation rate (mole %) | | | | Temperature | Surfactant |

(‡)
A: polymer block of a vinyl aromatic compound
B: polymer block of a conjugated diene

TABLE 2

|  | Water content of the dried crumbs (wt %) | Bulk density of microporous crumbs (g/cc) | Total volume of the micropore (cc/g) | Ratio of micropores having the pore diameter of 0.14–3.9 μm (%) | Oil absorption | |
|---|---|---|---|---|---|---|
|  |  |  |  |  | Oil absorption factor for 3 min. | Oil absorption factor for 30 min. |
| Example 1 | 0.1 | 0.23 | 0.80 | 15 | 3.2 | 4.5 |
| Comparative example 1 | 0.08 | 0.16 | 0.78 | 6 | 3.1 | 4.2 |
| Example 2 | 0.1 | 0.25 | 0.70 | 22 | 3.6 | 4.8 |
| Comparative example 2 | 0.1 | 0.30 | 0.35 | 6 | 1.6 | 2.3 |
| Example 3 | 0.08 | 0.23 | 0.60 | 21 | 3.3 | 4.1 |
| Comparative example 3 | 0.1 | 0.14 | 0.78 | 4 | 3.5 | 4.3 |

|  | Handling property of crumbs after the absorption of oil | Properties of molded product | | | | |
|---|---|---|---|---|---|---|
|  |  | Appearance of molded product | | | Physical property of molded product | |
|  |  | Oil bleeding | Non-melted matter | Foaming | Strength at break (kg/cm²) | Elongation at break (%) |
| Example 1 | ♦ | ♦ | ◊ | ♦ | 130 | 860 |
| Comparative example 1 | × | × | ◊ | ◊ | 78 | 770 |
| Example 2 | ♦ | ♦ | ◊ | ♦ | 105 | 850 |
| Comparative example 2 | ◊ | × | × | ♦ | 70 | 790 |
| Example 3 | ♦ | ♦ | ◊ | ♦ | 65 | 250 |
| Comparative example 3 | × | × | ◊ | ◊ | 30 | 180 |

Obviously, numerous modifications and variations are possible in light of the above teachings. It is therefore to be understood that within the scope of the appended claims the present invention can be practiced otherwise than as specifically described herein.

The disclosure of Japanese priority application 72,414/1995 is hereby incorporated by reference.

What is claimed is:

1. Microporous crumbs of a hydrogenated block copolymer, wherein said hydrogenated block copolymer is obtained by hydrogenating more than 50% of unsaturated bonds derived from conjugated diene of a block copolymer comprising at least one polymer block consisting essentially of a vinyl aromatic compound and at least one polymer block consisting essentially of a conjugated diene in which the weight ratio of the vinyl aromatic compound to the conjugated diene is within a range from 5/95 to 95/5, and wherein said crumbs have (1) a bulk density of more than 0.18 g/cc, (2) a total volume of micropores of more than 0.4 cc/g and (3) a ratio of the sum of the volume of micropores having a pore diameter within a range from 0.14 to 3.9 μm based on the total volume of the micropores of more than 8%.

2. The microporous crumbs according to claim 1, wherein the ratio of crumbs of particle size from 0.2 to 5 mm to the total crumbs is more than 90% by weight.

3. A process for producing microporous crumbs of a hydrogenated block copolymer, which comprises feeding a solution of 5% to 60% by weight of a hydrogenated block copolymer in a hydrocarbon solvent into hot water while maintaining the temperature of said solution at 40° C.–150° C., and then steam stripping at a temperature higher than the boiling point of the hydrocarbon solvent or higher than the azeotropic point of the hydrocarbon solvent and water when they form an azeotropic mixture and lower than 150° C., wherein said hydrogenated block copolymer is obtained by hydrogenating more than 50% of unsaturated bonds derived from conjugated diene of a block copolymer comprising at least one polymer block consisting essentially of a vinyl aromatic compound and at least one polymer block consisting essentially of a conjugated diene in which the weight ratio of the vinyl aromatic compound to the conjugated diene is within a range from 5/95 to 95/5.

4. A process for producing microporous crumbs of a hydrogenated block copolymer according to claim 3, wherein the concentration of the hydrogenated block copolymer in the hydrocarbon solvent is within a range from 10 to 50% by weight.

5. A process for producing microporous crumbs of a hydrogenated block copolymer according to claim 3, wherein steam stripping is conducted at a temperature within a range from 90° C. to 140° C.

6. A process for producing microporous crumbs of a hydrogenated block copolymer according to claim 3, wherein steam stripping is conducted at a temperature within a range from 95° C. to 120° C.

* * * * *